United States Patent [19]

Kunimune

[11] 4,430,477

[45] Feb. 7, 1984

[54] POLYPROPYLENE COMPOSITION

[75] Inventor: Kohichi Kunimune, Ichiharashi, Japan

[73] Assignee: Chisso Corporation, Osaka, Japan

[21] Appl. No.: 498,504

[22] Filed: May 26, 1983

[30] Foreign Application Priority Data

Jun. 3, 1982 [JP] Japan ................................ 57-95359

[51] Int. Cl.³ ...................... C08L 51/06; C08L 23/12; C08L 23/28
[52] U.S. Cl. .................................... 525/70; 525/324; 525/193; 525/76; 525/75; 525/249
[58] Field of Search ................................ 525/70, 324

[56] References Cited

U.S. PATENT DOCUMENTS

| | | | |
|---|---|---|---|
| 3,496,251 | 2/1970 | Takahashi et al. | 525/70 |
| 3,558,745 | 1/1971 | Ogawa et al. | 525/70 |
| 3,565,974 | 2/1971 | Ohnuma et al. | 525/324 |
| 3,673,279 | 6/1972 | Takahashi et al. | 525/70 |
| 3,819,763 | 6/1974 | Akane et al. | 525/70 |
| 4,112,013 | 9/1978 | Briggs et al. | 525/324 |

*Primary Examiner*—Carman J. Seccuro
*Attorney, Agent, or Firm*—Fred Philpitt

[57] ABSTRACT

A propylene composition having a notably improved high-impact strength and elongation at break, with a relatively slight reduction in rigidity is provided, which composition is a high-impact polypropylene composition comprising 60 to 95 parts by weight of polypropylene and 40 to 5 parts by weight of a chlorinated polyolefin having styrene graft-polymerized thereon.

8 Claims, No Drawings

POLYPROPYLENE COMPOSITION

BACKGROUND OF THE INVENTION

1. Field of the Invention

This invention relates to a polypropylene composition. More particularly it relates to a high-impact polypropylene composition comprising polypropylene and a chlorinated polyolefin having styrene graft-polymerized thereon (hereinafter abbreviated to Cl.PO-g-St).

2. Description of the Prior Art

Polypropylene is superior in chemical and physical properties and has been used in a large amount as a general-purpose resin, but from a viewpoint of practical physical properties, it has a drawback of being inferior in high-impact strength. In order to overcome this drawback, a great deal of effort and a number of proposals have so far been made, and any of them are roughly classified into a process of blending a rubbery material to polypropylene and a copolymerization process wherein ethylene, butene-1 or the like is used as a copolymerization component in propylene polymerization. The blending process has had drawbacks that if the amount of a rubbery material added is increased in order to increase the high-impact strength of polypropylene, the rigidity and hardness of polypropylene as its merits are notably reduced and further its compatability becomes inferior to reduce its transparency, luster, surface smoothness, etc. On the other hand, the copolymerization process also has had drawbacks that as the amount of copolymerized component is increased, mechanical properties of polypropylene such as rigidity, hardness, etc. become inferior, and also thermal properties such as melting point, softening point, etc. become notably inferior; hence it has been difficult to make these properties consistent with high-impact properties.

The present inventor have made strenuous efforts in order to solve the above-mentioned problems relative to improvement in the high-impact properties of polypropylene, and as a result, have found that when a specified polymer is blended to polypropylene, it is possible to improve the high-impact properties while the reduction in rigidity and hardness is kept minimum.

SUMMARY OF THE INVENTION

The object of the invention is to provide a propylene composition having the reduction in rigidity well balanced with the improvement in high-impact properties.

The present invention resides in:

(1) a high-impact polypropylene composition comprising 60 to 95 parts by weight of polypropylene and 40 to 5 parts by weight of a chlorinated polyolefin having styrene graft-polymerized thereon (hereinafter abbreviated to Cl.PO-g-St);

(2) a polypropylene composition according to the above item (1) wherein the chlorine content of the chlorinated polyolefin is 5 to 50% by weight and the styrene content of the Cl.PO-g-St is 5 to 40% by weight;

(3) a polypropylene composition according to the above item (1) or (2) wherein the chlorinated polyolefin is a chlorinated polyethylene or a chlorinated EPM; and (4) a polypropylene composition according to the above item (1), (2) or (3) wherein the Cl.PO-g-St is obtained by graft-polymerizing styrene on a chlorinated polyolefin in the presence of a catalyst having as its main component, an organoaluminum compound expressed by the general formula $$AlR_nX_{3-n}$$

wherein R represents the same or different alkyl, aryl or aralkyl groups; X represents a halogen atom; and n represents a number of 1, 1.5, 2 or 3.

DETAILED DESCRIPTION OF THE PREFERRED EMBODIMENTS

The chlorinated polyolefin refers to chlorinated products of polymers or copolymers of lower olefins such as ethylene, propylene, butene, etc., and concrete examples thereof are chlorinated polyethylenes obtained by chlorinating low density polyethylene, medium density polyethylene, high density polyethylene, low pressure low density polyethylene or the like, chlorinated polypropylenes obtained by chlorinating crystalline isotactic polypropylene or non-crystalline atactic polypropylene, chlorinated polybutenes obtained by chlorinating crystalline polybutene prepared by polymerizing butene-1 in the presence of the so-called Ziegler system catalyst or obtained by polymerizing isobutene in the presence of a cationic polymerization catalyst, and further, chlorinated products of EPM or EPDM, etc.

As for the chlorinated polyolefins, those having a chlorine content of 5 to 50% by weight, preferably 15 to 40% by weight are used. If the chlorine content is less than 5% by weight, the effectiveness of improvement in physical properties of polypropylene is insufficient, while if the content exceeds 50% by weight, the compatibility of the chlorinated polyolefin with polypropylene is reduced to make the physical properties of the resulting composition inferior. Thus the contents outside the above range are undesirable.

As for the process for graft-polymerizing styrene on the chlorinated polyolefin, it is possible to employ a known method such as solution polymerization or suspension polymerization or the like in the presence of a free-radical initiator such as benzoyl peroxide or azobisbutyronitrile, as catalyst. Graft copolymers obtained according to these methods can be used as a component of the composition of the present invention. Further, polymers obtained by graft-polymerization styrene on a chlorinated polyolefin according to a polymerization method such as solution polymerization or suspension polymerization or the like in the presence of an organoaluminum compound as catalyst, expressed by the general formula $AlR_nX_{3-n}$ wherein R represents the same or different kinds of alkyl, aryl or aralkyl groups; X represents a halogen atom; and n represents a number of 1, 1.5, 2 or 3, have a superior heat stability at the time of melt-processing; hence they are suitably used as a component of the composition of the present invention.

As for the thus obtained graft copolymers, those having a styrene content of 5 to 40% by weight, preferably, 10 to 25% by weight are used for the present invention. If the styrene content is less than 5% by weight, the effectiveness of improvement in physical properties of polypropylene is poor, while if it exceeds 40% by weight, its compatibility with polypropylene is reduced. Thus, the contents outside the range are undesirable.

Polypropylene as a main component of the composition of the present invention refers to crystalline polypropylene obtained by polymerizing propylene in the presence of the so-called Ziegler-Natta type catalyst, and it also refers to not only homopolymer of propylene but also copolymers of propylene as a main component with ethylene, butene-1, 4-methyl-pentene or the like. The polypropylene has no particular limitation to its melt flow rate (MFR), but if a notable effectiveness of improvement in processing properties and physical properties are taken into consideration, its MFR is suitably in the range of 0.5 to 30, preferably 1 to 15.

The proportions of polypropylene and Cl.PO-g-St to be blended thereto in the composition of the present invention is in the range of 60 to 95 parts by weight of polypropylene and 40 to 5 parts by weight of Cl.PO-g-St. If the proportion of Cl.PO-g-St exceeds 40 parts by weight, its compatibility with polypropylene is reduced to make the physical properties of the resulting composition inferior, while if it is less than 5 parts by weight, the effectiveness of improvement in physical properties of polypropylene is insufficient; hence the proportions outside the above range are undesirable.

Blending of polypropylene to Cl.PO-g-St can be effected by melt-kneading them at a resin temperature of 170° to 220° C. using a known apparatus such as extruder, heated rolls, Banbury mixer or the like. If the resin temperature is lower than 170° C., fusion of the resins is insufficient, while if it exceeds 220° C., thermal decomposition of Cl.PO-g-St is notable; hence the temperatures outside the range are undesirable. In this blending it is possible to add agents to be usually incorporated into polypropylene such as stabilizer, coloring agent, filler, etc. in the range where the object of the present invention is not damaged.

The propylene composition of the present invention can be molded into various molded products, sheets, films or the like according to usual molding process such as injection molding process, blow molding process, extrusion molding process. The thus obtained molded products have a much improved high-impact strength without notable reduction in the rigidity and hardness intrinsic of polypropylene.

Further, the composition of the present invention contains chlorine, and when an inorganic filler such as antimony oxide, aluminum hydroxide or the like is blended to the composition, or not blended thereto, the composition has an improved flame retardancy and hot melt adhesive properties to inorganic stocks such as metal, glass, etc.

The present invention will be concretely described below by way of Examples.

The methods for measuring values of physical properties shown in Examples are as follows:
  Preparation of test pieces: Molded at a resin temperature of 200° C., using Min-Max molding machine (manufactured by Cust. Sci. Inst. Co.).
  Tensile test: Measured at 25° C., at a tensile rate of 23.0 mm/min., using Min-Max tensile tester manufactured by Cust. Sci. Inst. Co.
  Tensile impact test: Measured using Min-Max impact tester manufactured by Cust. Sci. Inst. Co.

EXAMPLES 1~4 AND COMPARATIVE EXAMPLES 1~3

Powder of a chlorinated polyethylene having chlorine content of 35% by weight (150 g), prepared by chlorinating a low density polyethylene having a melt index (MI) of 20 was taken into a 2 l capacity glass flask purged with nitrogen gas in advance, and successively n-hexane (500 ml) and diethyl aluminum chloride (15 mmols) were added. Then, while the temperature inside the flask was kept at 20° C., styrene (100 ml) was gradually dropwise added through a dropping funnel with stirring over 30 minutes for reaction, followed by further continuing the reaction with stirring for one hour. After lapse of the reaction time, methanol (50 ml) was dropwise added to deactivate the catalyst, followed by filtering off and washing the resulting reaction product with a large amount of methanol and drying in vacuo at 50° C. over night to obtain a graftmer (Cl.PE-g.St) having a styrene content of 16% by weight (175 g).

This graftmer in amounts indicated in Table mentioned below was blended to two kinds of crystalline polypropylene one of which had a melt flow rate (MFR) of 4 and the other of which had a melt flow rate of 10, respectively. To the resulting composition was added BHT (3,5-di-t-butyl-4-hydroxytoluene) (0.02 phr), followed by kneading and granulation at a resin temperature of 200° C. by means of an extruder. All of the resulting pellets were white and had a smooth and lustrous surface. The blending ratios and the results of the test of physical properties are shown in the Table.

For comparison, the above-mentioned two kinds of polypropylene, each alone, and a blend of 70% by weight of the above polypropylene having a MFR of 4.0 to 30% by weight of an EPM were granulated as in Examples. The values of physical properties and the results are also shown in the Table. In addition, the EPM had a MI of 0.6, an ethylene content of 60% by weight and a propylene content of 40% by weight.

EXAMPLES 5 AND 6

Using the same apparatus and procedure as in Example 1, a chlorinated polyethylene having a chlorine content of 15% by weight (100 g), prepared by chlorinating a high density polyethylene having a MI of 0.8, n-pentane (500 ml) and diethylaluminum chloride (18 mmols) were fed, and while the temperature inside the flask was kept at 10° C., styrene (150 ml) was dropwise added with stirring over 30 minutes for reaction, followed by further continuing the reaction with stirring for one hour. After lapse of the reaction time, termination of the reaction, filtering off, washing and drying were carried out as in Example 1 to obtain a graftmer (Cl.PE.g.St) having a styrene content of 23% by weight (123 g).

Using the same apparatus and procedure as in Example 1, this graftmer was blended to a polypropylene having a MFR of 4.0 in proportions indicated in the Table, followed by granulation. All of the resulting pellets were white and had a smooth and lustrous surface. The values of physical properties of these products are shown in the Table.

COMPARATIVE EXAMPLES 4 AND 5

The chlorinated polyethylene used in Example 1 and that used in Example 5 were respectively blended in a blending proportion of 30% by weight, to 70% by weight of a polypropylene having a MFR of 4.0, followed by adding BHT (0.02 phr) and kneading and granulating at a resin temperature of 200° C., by means of an extruder. All of the resulting pellets were colored to yellow and had a roughened and non-lustrous surface.

EXAMPLES 7 AND 8 AND COMPARATIVE EXAMPLES 6 AND 7

Into the same apparatus as in Example 1, purged with nitrogen gas, were fed a chlorinated EPM having a chlorine content of 15% by weight (100 g), prepared by chlorinating an EPM having an ethylene content of 60% by weight, a propylene content of 40% by weight and a MI of 0.6, and toluene (800 ml), and these were agitated to dissolve the chlorinated EPM, followed by adding diethylaluminum (15 mmols). Then, while the temperature inside the flask was kept at −10° C., styrene was dropwise added with stirring over one hour for reaction, and the reaction was further continued with stirring for 2 hours. After lapse of the reaction time, methanol (50 ml) was added to deactivate the catalyst, and the resulting reaction liquid was fed in a large amount of methanol to precipitate polymer, followed by filtering off, washing and drying as in Example 1 to obtain a graftmer (Cl.EPM-g-St) having a styrene content of 28% by weight (125 g).

Using the same apparatus and procedure as in Example 1, this graftmer was blended to a crystalline polypropylene having a MFR of 15 in proportions indicated in the Table, followed by granulation. All of the resulting pellets were white and had a smooth and lustrous surface. The blending proportions and the results of the test of physical properties are shown in the Table.

For comparison, the above polypropylene alone and a blend of 70% by weight of this polypropylene to 30% by weight of EPM were granulated as in Example 1. The values of physical properties of these products are also shown in the Table.

ing styrene graft-polymerized thereon (hereinafter abbreviated to Cl.PO-g-St).

2. A polypropylene composition according to claim 1 wherein the chlorine content of said chlorinated polyolefin is 5 to 50% by weight and the styrene content of said Cl.PO-g-St is 5 to 40% by weight.

3. A polypropylene composition according to claim 1 wherein said chlorinated polyolefin is a chlorinated polyethylene or a chlorinated EPM.

4. A polypropylene composition according to claim 2 wherein said chlorinated polyolefin is a chlorinated polyethylene or a chlorinated EPM.

5. A polypropylene composition according to claim 1 wherein said Cl.PO-g-St is obtained by graft-polymerizing styrene on a chlorinated polyolefin in the presence of a catalyst having as its main component, an organoaluminum compound expressed by the general formula $$AlR_nX_{3-n}$$

wherein R represents the same or different alkyl, aryl or aralkyl groups; X represents a halogen atom; and n represents a number of 1, 1.5, 2 or 3.

6. A polypropylene composition according to claim 2 wherein said Cl.PO-g-St is obtained by graft-polymerizing styrene on a chlorinated polyolefin in the presence of a catalyst having as its main component, an organo-

|  | Blending | | Physical properties | | |
|---|---|---|---|---|---|
|  | Polypropylene | Graftmer | Elongation at break % | Tensile modulus Kg/cm | Tensile impact strength Kg · cm/cm² |
|  | MFR | Blending ratio | Blending ratio |  |  |  |
| Example 1 | 4 | 90 | 10*1 | >220 | 10,900 | 57 |
| Example 2 | 4 | 70 | 30*1 | >220 | 9,200 | 91 |
| Example 3 | 10 | 90 | 10*1 | >220 | 10,900 | 52 |
| Example 4 | 10 | 70 | 30*1 | >220 | 9,400 | 81 |
| Compar. ex. 1 | 4 | 100 | — | 65 | 12,000 | 35 |
| Compar. ex. 2 | 10 | 100 | — | 60 | 12,300 | 33 |
| Compar. ex. 3 | 4 | 70 | 30*2 | >220 | 7,400 | 70 |
| Example 5 | 4 | 85 | 15*3 | >220 | 10,500 | 54 |
| Example 6 | 4 | 65 | 35*3 | >220 | 9,300 | 85 |
| Example 7 | 15 | 90 | 10*4 | >220 | 10,800 | 55 |
| Example 8 | 15 | 70 | 30*4 | >220 | 9,000 | 76 |
| Compar. ex. 6 | 15 | 100 | — | 60 | 12,400 | 28 |
| Compar. ex. 7 | 15 | 70 | 30*2 | >220 | 7,400 | 68 |

*1 Cl.PE-g-St: St content 16%
*2 EPM: MI = 0.6, C₂⁼ = 60%, C₃⁼ = 40%
*3 Cl.PE-g-St: St content 23%
*4 Cl.EPM-g-St: St content 28%

As apparent from the above results, if a rubbery material such as EPM is blended to polypropylene, high-impact properties of the latter are improved, but its rigidity is notably reduced, and if a chlorinated polyethylene is blended to polypropylene, the resulting blend causes heat deterioration under processing conditions of polypropylene; hence desirable results cannot be obtained. Whereas, in the case of the composition of the present invention, it is observed that the high-impact strength and elongation at break of polypropylene are notably improved with a relatively slight reduction in rigidity.

What is claimed is:

1. A high-impact polypropylene composition comprising 60 to 95 parts by weight of polypropylene and 40 to 5 parts by weight of a chlorinated polyolefin havaluminum compound expressed by the general formula $$AlR_nX_{3-n}$$

wherein R represents the same or different alkyl, aryl or aralkyl groups; X represents a halogen atom; and n represents a number of 1, 1.5, 2 or 3.

7. A polypropylene composition according to claim 3 wherein said Cl.PO-g-St is obtained by graft-polymerizing styrene on a chlorinated polyolefin in the presence of a catalyst having as its main component, an organoaluminum compound expressed by the general formula $$AlR_nX_{3-n}$$

wherein R represents the same or different alkyl, aryl or aralkyl groups; X represents a halogen atom; and n represents a number of 1, 1.5, 2 or 3.

8. A polypropylene composition according to claim 4 wherein said Cl.PO-g-St is obtained by graft-polymerizing styrene on a chlorinated polyolefin in the presence of a catalyst having as its main component, an organoaluminum compound expressed by the general formula $$AlR_nX_{3-n}$$

wherein R represents the same or different alkyl, aryl or aralkyl groups; X represents a halogen atom, and n represents a number of 1, 1.5, 2 or 3.

* * * * *